W. F. O'REILLY.
Improvement in Brick-Machines.
No. 130,236.　　Fig. 1.　　Patented Aug. 6, 1872.
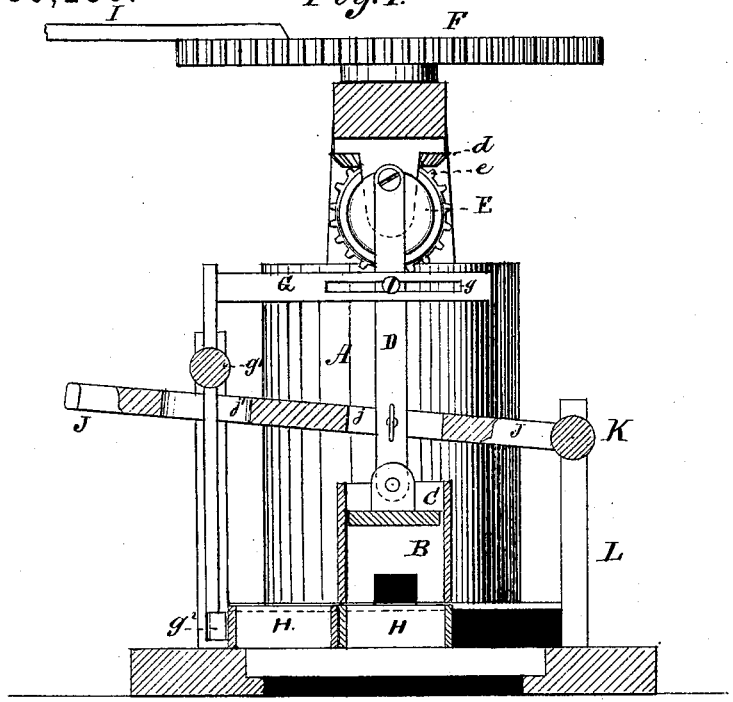
Fig. 2.
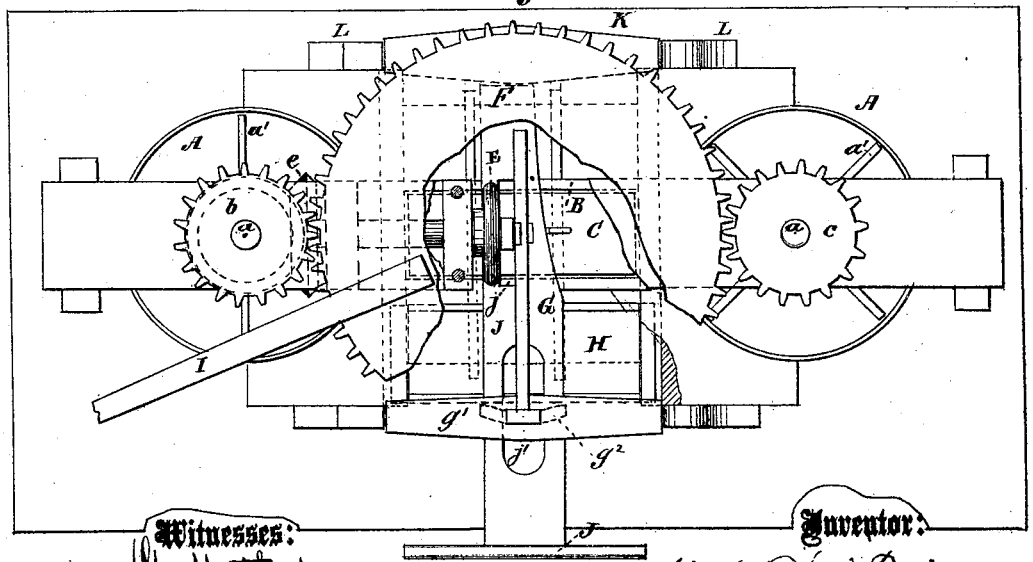
Witnesses:
G. Mathys.
Colon C. Lemon
Inventor:
Wm. F. O'Reilly
Per
Attorneys.

UNITED STATES PATENT OFFICE.

WILLIAM F. O'REILLY, OF STARKVILLE, MISSISSIPPI.

IMPROVEMENT IN BRICK-MACHINES.

Specification forming part of Letters Patent No. 130,236, dated August 6, 1872.

Specification describing an Improvement in Brick-Machines, invented by WILLIAM F. O'REILLY, of Starkville, in the county of Oktibbeha and State of Mississippi.

The invention consists in operating two pug-mills, an intermediate press, and a mold supplier and discharger by the same operative mechanism, whereby bricks may be made in the most effective and workmanlike manner, and at a reduced cost.

In the drawing, Figure 1 is a vertical cross-section; Fig. 2, a top view with parts broken out.

A A represent two cylinders, between which is placed a press-box, B. In this box plays the vertical follower C to compress the clay into the shape required. To this follower is attached a crank-pitman, D, connected by a crank-pin to the wheel E. F is a large spur-wheel which drives the smaller wheels $b\ c\ d\ e$, and thereby operates the shafts $a\ a$ of the stirrers $a'\ a'$. To the crank-pitman D is attached an angle-lever, G, which is slotted at $g$, held by a rock-shaft, $g^1$, and provided with a push-piece, $g^2$, at the lower end. H is a series of molds which slide under the bottom of press-box B, and receive the clay which is forced thereinto through the holes that connect the pug-mills with the press-box. I is the long arm by which power is applied to the machinery, so as to operate simultaneously the clay stirrers and mixers, the compressing follower, and the lever that slides the molds in and out under the press-box. J is a hand-lever, slotted at $j\ j'$ to allow the crank-pitman D and arm of lever G to pass therethrough. It is fastened to a rock-shaft, K, journaled in two uprights, L L.

The operation is as follows: The clay is placed in the cylinders A A, thoroughly intermixed by stirrers $a'$, and then forced through holes into press-box. There it is received by the molds, into which it is pressed by the follower C. As the follower rises the lever G pushes the filled mold out at the other side of press-box, and when said lever moves back an empty mold is placed by hand in front of the push-piece $g^2$. The follower C may be disconnected from the operative mechanism and operated by the hand-lever J, if it is desired.

Having thus described my invention, what I claim as new, and desire to secure by Letters Patent, is—

The combination of two pug-mills, A $a\ a'$, press B C, and mold-sliding lever G with the within-described operative mechanism, as and for the purpose described.

W. F. O'REILLY.

Witnesses:
SOLON C. KEMON,
CHAS. A. PETTIT.